United States Patent
Huang et al.

(10) Patent No.: US 7,307,965 B2
(45) Date of Patent: *Dec. 11, 2007

(54) ECHO CANCELLATION DEVICE FOR FULL DUPLEX COMMUNICATION SYSTEMS

(75) Inventors: Chen-Chih Huang, Hsin-Chu Hsien (TW); Mu-Jung Chen, Kao-Hsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 513 days.

This patent is subject to a terminal disclaimer.

(21) Appl. No.: 10/711,294

(22) Filed: Sep. 8, 2004

(65) Prior Publication Data

US 2005/0152262 A1    Jul. 14, 2005

Related U.S. Application Data

(63) Continuation-in-part of application No. 10/709,935, filed on Jun. 7, 2004.

(30) Foreign Application Priority Data

Jan. 14, 2004    (TW) .................................. 93100947

(51) Int. Cl.
*H04M 3/20*    (2006.01)
*H04M 4/20*    (2006.01)

(52) U.S. Cl. .................................. 370/286; 379/406.01

(58) Field of Classification Search ..................... None
See application file for complete search history.

(56) References Cited

U.S. PATENT DOCUMENTS

| 5,694,474 A | 12/1997 | Ngo et al. |
| 5,812,537 A | 9/1998 | Betts et al. |
| 5,960,077 A | 9/1999 | Ishii et al. |
| 6,373,908 B2 | 4/2002 | Chan |
| 6,775,529 B1 | 8/2004 | Roo |
| 6,947,478 B1 | 9/2005 | Hauptmann et al. |
| 6,980,644 B1 | 12/2005 | Sallaway et al. |
| 2002/0101983 A1 | 8/2002 | Lee |

FOREIGN PATENT DOCUMENTS

| TW | 318989 | 11/1997 |
| TW | 507433 | 10/2002 |

OTHER PUBLICATIONS

"15MHz, BiMOS Operational Amplifier with MOSFET Input/ CMOS Output.", HARRIS Semiconductor, Sep. 1998, pp. 1, 4, CA3130, CA3130A, No. 817.4

*Primary Examiner*—Ramnandan Singh
(74) *Attorney, Agent, or Firm*—Winston Hsu

(57) ABSTRACT

The invention relates to an echo cancellation device for a full duplex communication system. The echo cancellation device utilizes a pull-up current source to increase the DC level, so as to improve the echo cancellation performance with avoiding signal distortion. And the pull-up current source used in the echo cancellation device can be implemented to a fixed current source or an adjustable current source.

22 Claims, 4 Drawing Sheets

ECHO CANCELLATION DEVICE FOR FULL DUPLEX COMMUNICATION SYSTEMS

CROSS REFERENCE TO RELATED APPLICATIONS

This is a continuation-in-part of U.S. application Ser. No. 10/709,935, filed Jun. 7, 2004, entitled "ECHO CANCELLATION DEVICE FOR A FULL DUPLEX COMMUNICATION SYSTEM", which is cooperated by reference herein.

BACKGROUND OF THE INVENTION

1. Field of the Invention

The present invention relates to a full duplex communication system, and more particularly, to an echo cancellation device for use in a full duplex communication system.

2. Description of the Prior Art

As technology advances, network applications have become more and more popular. Network bandwidth requirements are also increasing as the transmission speed of data transmission standards such as Ethernet have raised from 10/100 Mps to above 1 Gbps. As is well known in the art, each port of a 1 Gbps fast Ethernet device has four channels, wherein each of the four channels has a transceiver.

Please refer to FIG. 1. FIG. 1 depicts a simplified schematic diagram of a conventional transceiver 100 in a channel of a 1 Gbps Ethernet device. In general, the transceiver 100 is coupled to a twisted pair 118 via a line interface 116. As shown in FIG. 1, the transceiver 100 comprises a transmitter section 104 and a receiver section 106. The transmitter section 104 has a digital-to-analog converter (DAC) 108 for converting a transmit signal (a near-end signal) into analog form. The analog transmit signal is then transmitted to a far-end network device via the line interface 116 and the twisted pair 118. The receiver section 106 has an analog-front-end (AFE) circuit 112 for processing a receive signal (a far-end signal) received from the line interface 116, and an analog-to-digital converter (ADC) 114 for converting the processed signals into digital form. The digital signal is then sent to following stages for further processing. The 1 Gbps Ethernet device and the far-end network device both simultaneously utilize four channels where each channel simultaneously performs transmitting and receiving operations. As a result, the 1 Gbps Ethernet device is a full duplex communication system.

As mentioned above, each channel of the 1 Gbps Ethernet device simultaneously performs transmitting and receiving operations. When the channel is transmitting, the signals received from the channel are affected by the transmission, and this phenomenon is known as echo impairment. In order to reduce echo impairment in a communication system, an echo cancellation device 110 and an echo cancellation resistor Rp are usually employed in the conventional transceiver 100. The echo cancellation device 110 is usually a DAC for generating a cancellation signal that corresponds to the transmit signal output from the DAC 108 in order to cancel the effects of the transmit signal on the receiver section 106 and thereby achieve echo cancellation.

Please refer to FIG. 2, which is an equivalent circuit diagram of the conventional transceiver 100 of FIG. 1. The electrical equivalence of the DAC 108 and the echo cancellation device 110 are current sources Id and Ic, respectively. In order to achieve echo cancellation for the receiver section 106, the effect caused by the output of the current source Id must be canceled by the output of the current source Ic.

Please refer to FIG. 3, which is a small signal model for the equivalent circuit diagram of FIG. 2. In FIG. 2, Zo is the equivalent output impedance of the transmitter section 104, and Zi is the equivalent input impedance of the receiver section 106. Vo is the output signal of the transceiver 100 and also the transmit signal output from the transmitter section 104. Vi is the echo on the receiver section 106 caused by the transmit signal. In the conventional art, the echo cancellation device 110 regards the equivalent output impedance Zo as a load resistor Re, and the resistance of the resistor Re consists of a matching resistor Rm, which is used to match impedance, and an equivalent resistor Rc of the channel coupled to the transceiver 100. From the small signal model shown in FIG. 3, the following formula can be obtained:

$$V_i = \frac{-Zi[IdZo + (Zo + Rp)Ic]}{Rp + Zi + Zo} \qquad (1)$$

In order to cancel the echo effect, Vi should be equal to 0, which satisfies:

$$IdZo + (Zo + Rp)Ic = 0 \qquad (2)$$

From formula (2), it is known that the relationship between Ic and Id is:

$$Ic = \frac{-Zo}{Rp + Zo} Id \qquad (3)$$

That is to say, if Ic and Id satisfy formula (3), the echo effect will be completely cancelled.

However, as mentioned above, the echo cancellation device 110 regards the equivalent output impedance Zo as the load resistor Re, which consists of the matching resistor Rm and the equivalent resistor Rc of the channel, but ignores an unavoidable parasitic capacitance effect that will occur in a practical implementation. Obviously, the echo effect of the transceiver 100 cannot be effectively reduced to the lowest level if the output impedance Zo is simply viewed as the load resistor Re in the prior art.

Furthermore, from FIG. 3, it is known that Vo>Vi. As the working voltage of transceiver ICs becomes lower and lower, both Vo and Vi also become lower and lower. If the working voltage of a transceiver IC becomes lower than a specific level, MOS transistors of the echo cancellation device 110 (electrically equivalent to the current source Ic) may become unable to maintain operation in the saturation region and therefore result in signal distortion in the conventional echo cancellation device 110.

SUMMARY OF INVENTION

It is therefore one of the objectives of the claimed invention to provide an echo cancellation device in a full duplex communication system to solve the parasitical capacitor effect with a filter in order to minimize the echo effect.

Another objective of the claimed invention is maintaining operation in the saturation region for MOS transistors in the echo cancellation device in order to improve the performance of the echo cancellation device.

According to a preferred embodiment of the present invention, an echo cancellation device in a full duplex communication system is disclosed. The full duplex communication system has a transmitter section for transmitting a transmit signal and a receiver section for receiving a receive signal. The echo cancellation device includes a filter for generating a filtering signal according to the transmit signal; an echo canceller coupled to the filter for generating an echo cancellation signal according to the filtering signal; and at least one resistor coupled to the transmitter section, the receiver section, and the echo canceller; wherein the echo canceller further comprises a pull-up current source for increasing the DC level of the echo canceller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
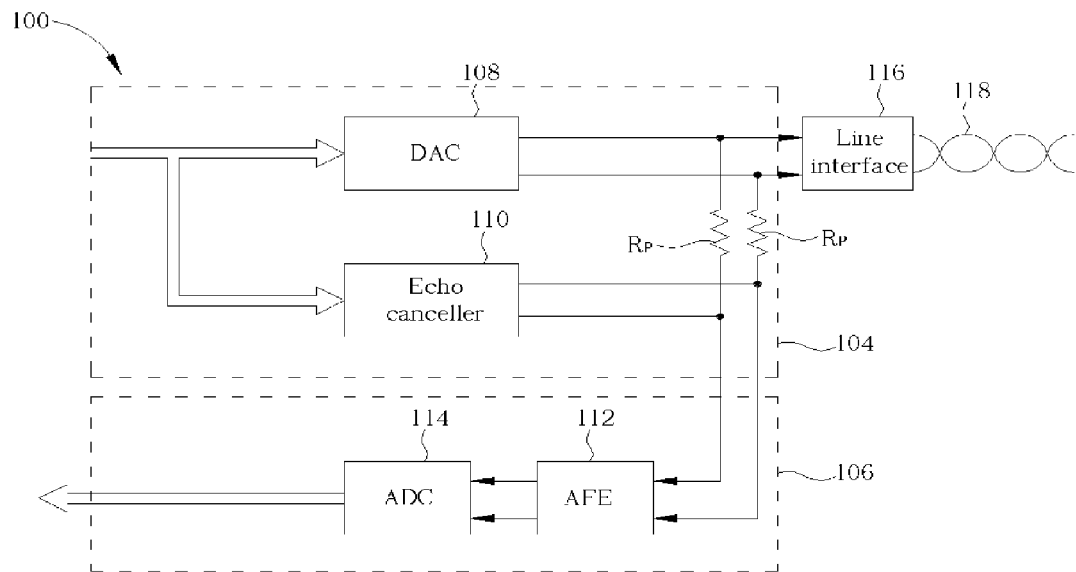
FIG. 1 is a simplified schematic diagram of a conventional transceiver in a channel of a fast Ethernet device.
Figure 2:
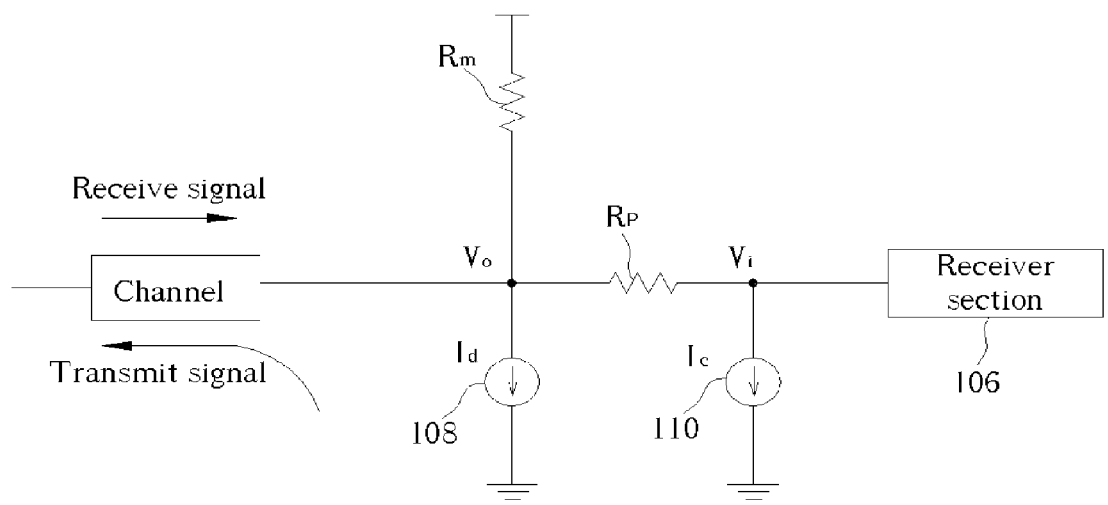
FIG. 2 is an equivalent circuit diagram of the conventional transceiver.
Figure 3:
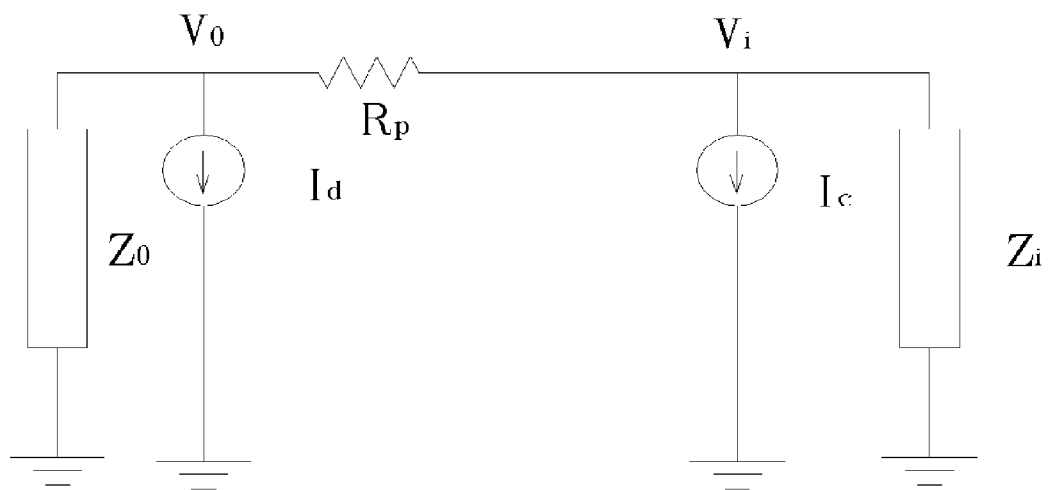
FIG. 3 is a small signal model for the equivalent circuit diagram of FIG. 2.

Please refer to FIG. 3. Since the unavoidable parasitic capacitance effect of practical implementations is considered by the present invention, the equivalent output impedance Zo is modified to be the parallel connection of a load resistor Re, which consists of the matching resistor Rm and the equivalent resistor Rc of the channel, and a parasitical capacitor Ce. This means Zo=Re//Ce. The effective output impedance Zo is calculated by the following equation:

$$Zo = \frac{Re}{sReCe + 1} \quad (4)$$

Substitute formula (4) into formula (3) to obtain the following formula (5):

$$Ic = \frac{-Re}{Rp + Re + sReRpCe} Id = H(s) \cdot Id \quad (5)$$

From formula (5), it can be seen that the relationship between Ic and Ic is actually a low pass transfer function H(s).

Figure 4:
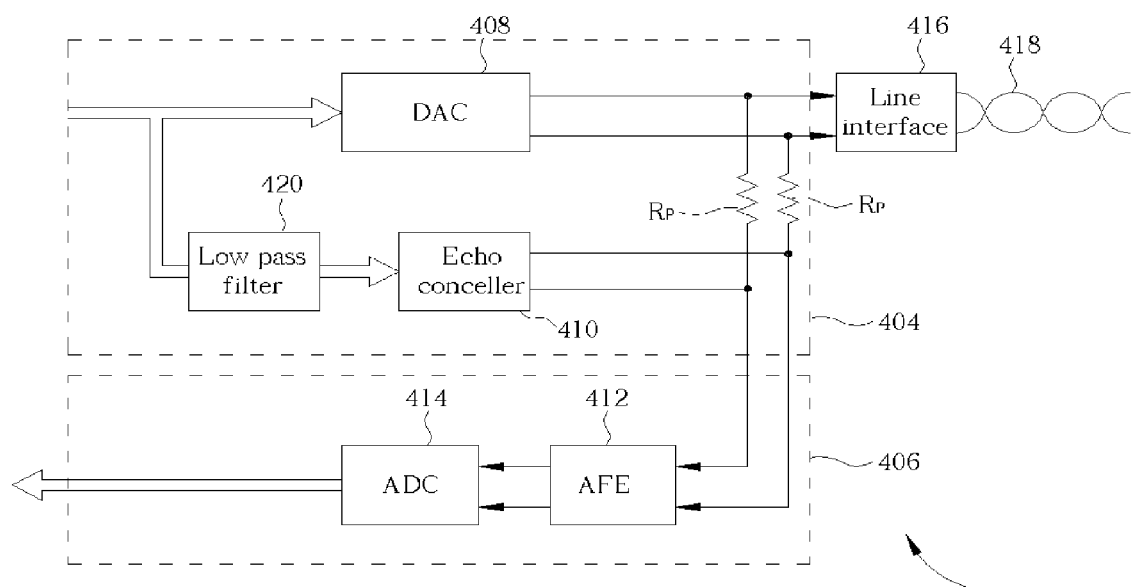
FIG. 4 is a simplified schematic diagram of a transceiver in a channel of a full duplex communication system according to a first embodiment of the present invention.

Please refer to FIG. 4, which depicts a simplified schematic diagram of a transceiver 400 in a channel of a full duplex communication system according to the first embodiment of the present invention. In the transceiver 400, the echo cancellation device of the embodiment of the present invention comprises an echo canceller 410 for generating a cancellation signal corresponding to a transmit signal output from the DAC 408, a resistor Rp coupled between a transmitter section 404 and a receiver section 406 of the transceiver 400, and a low pass filter 420 coupled to the echo canceller 410 as a previous stage of the echo canceller 410. The echo canceller 410 further comprises a pull-up current source for increasing its DC level. In a preferred practical implementation, the echo canceller 410 can be a digital-to-analog converter (DAC).

Figure 5:
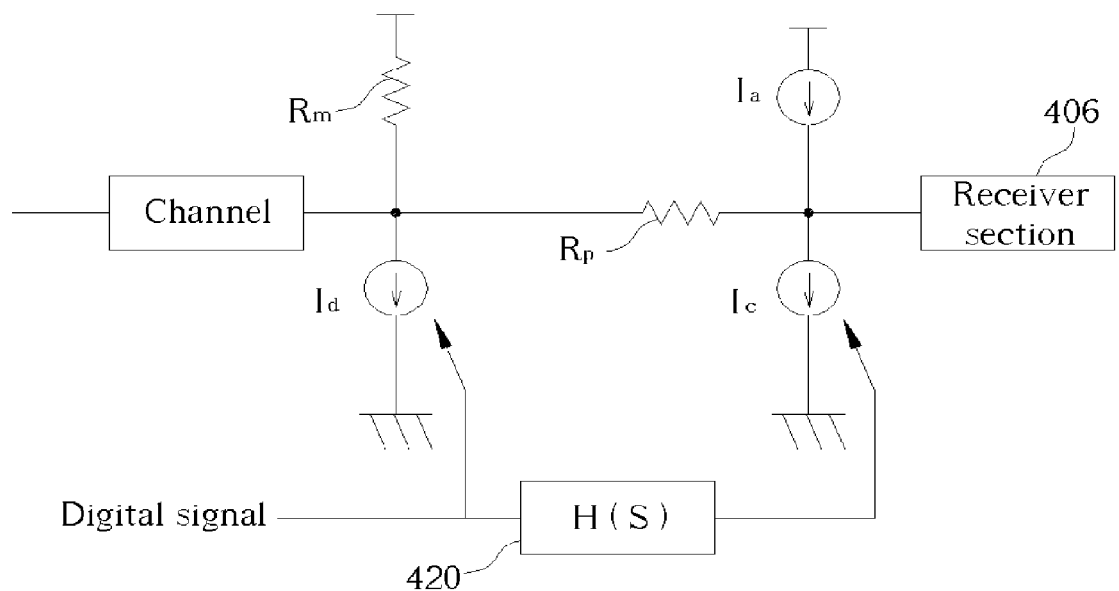
FIG. 5 and FIG. 6 are equivalent circuit diagrams of the transceiver according to the first embodiment of the present invention.
Figure 6:
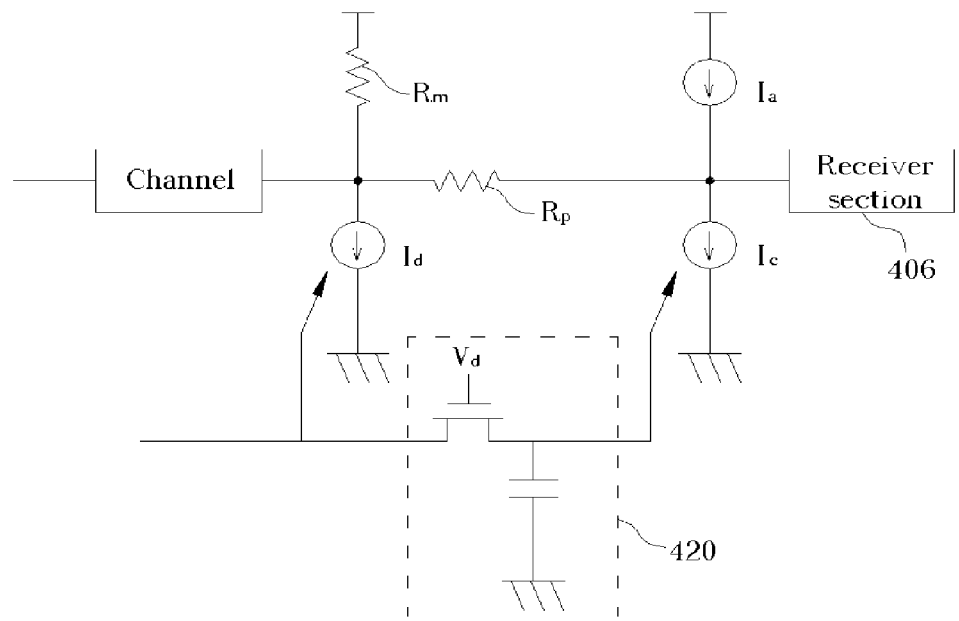

FIG. 5 depicts an equivalent circuit diagram of the transceiver 400 of the embodiment of the present invention. The electrical equivalent of the DAC 408, the echo canceller 410, and the pull-up current source are current sources Id, Ic, and Ia, respectively. The DAC 408 generates a transmit signal according to a digital signal. As mentioned above, the block H(s) shown in FIG. 5 is a low pass transfer function and can be implemented to satisfy formula (5) using either a digital means or an analog means. For example, a digital low pass filter can be employed to implement the block H(s). In another embodiment of the present invention, an RC network low pass filter, as shown in FIG. 6, can be employed to implement the block H(s). In FIG. 6, a capacitor of the RC network low pass filter 420 can be a metal stacked-layer capacitor or a parasitic capacitor, and a resistor of the RC network low pass filter 420 can be a MOS transistor. The resistance of the MOS transistor can be controlled by adjusting its gate voltage Vd.

Since the low pass filter 420 is employed in the echo cancellation device of the embodiment of the present invention, the cancellation signal output from the echo canceller 410 is capable of canceling the echo effect caused by the transmit signal output from the DAC 408, which is electrical equivalence as the current source Id. Wherein, the echo canceller 410 is the electrical equivalent of the current source Ic. The echo effect on the receiver section 406 is thereby minimized.

In addition, the echo cancellation device of the embodiment of the present invention further utilizes the pull-up current source, which is the electrical equivalent of the current source Ia in FIG. 5 and FIG. 6, to increase the DC level of Vi. Therefore, the MOS transistors of the equivalent current source Ic can maintain operation in the saturation region to avoid signal distortion. The echo cancellation performance of the echo canceller 410 of the present invention is thereby improved. In practical implementations, the pull-up current source (the equivalent current source Ia) can be a fix current source or an adjustable current source. That is to say, the output of the equivalent current source Ia can be a DC or an AC signal with a fixed DC level, or a DC or an AC signal with a DC level changing with the magnitude of the current source Ic.

Figure 7:
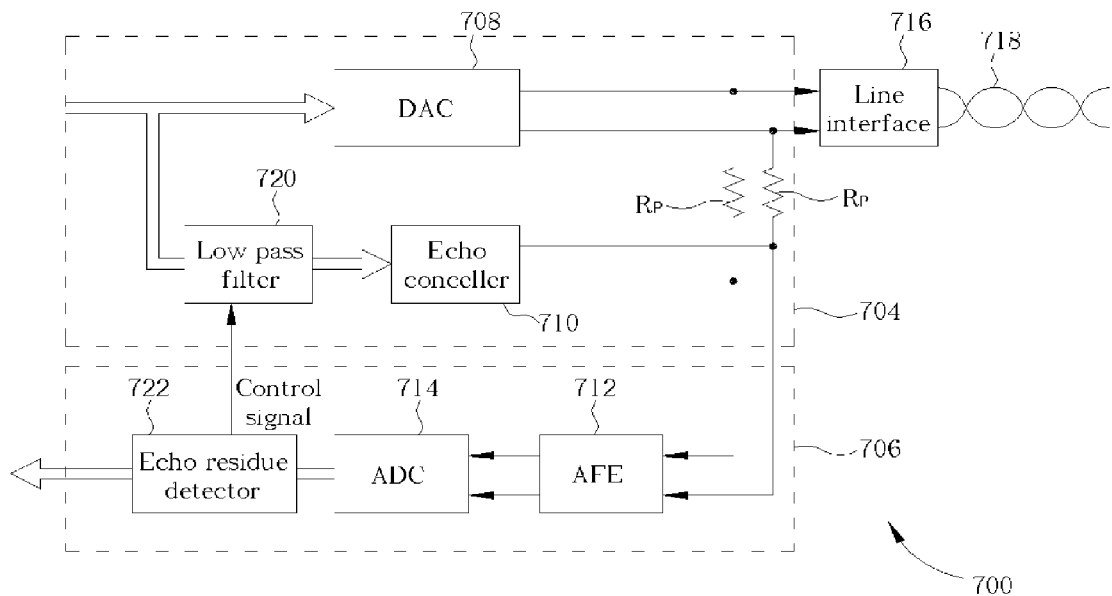
FIG. 7 is a simplified schematic diagram of a transceiver in a channel of a full duplex communication system according to a second embodiment of the present invention.

FIG. 7 depicts a simplified schematic diagram of a transceiver 700 in a channel of a full duplex communication system according to a second embodiment of the present invention. In practical implementations, the capacitance of the parasitic capacitor Ce, the resistance of the channel's equivalent resistor Rc, and the impedance of the matching resistor Rm is affected by the operating environment, temperature, manufacturing deviations, or the similar variations. Therefore the values will fluctuate and change when transmitting/receiving data. In order to more precisely eliminate the echo, in the second embodiment of the present invention, the echo cancellation device further comprises an echo residue detector 722 for detecting the echo residue at the receiver section 706. The echo residue detector 722 generates a control signal according to the detected echo residue and outputs the control signal to a low pass filter 720 to adjust the poles of the low pass transfer function H(s) to minimize the echo residue.

Figure 8:
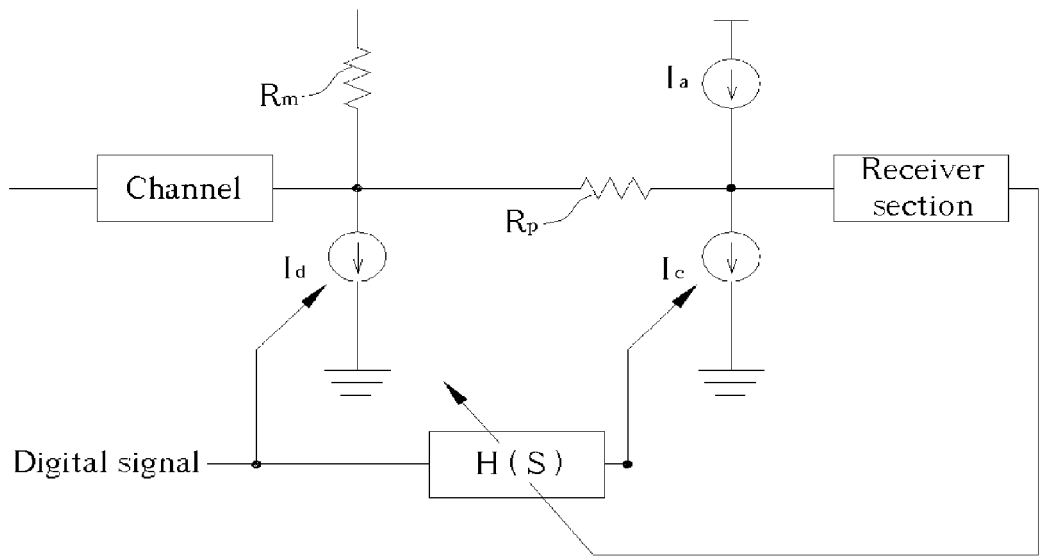
FIG. 8 is an equivalent circuit diagram of the transceiver according to the second embodiment of the present invention.

Please refer to FIG. 8, which depicts an equivalent circuit diagram of the transceiver 700 of the present invention. In FIG. 8, if the low pass filter 720 is a digital low pass filter, the echo residue detector 722 dynamically adjusts the finite impulse response (FIR) coefficients or the infinite impulse response (IIR) coefficients of the digital low pass filter according to the detected echo residue. If the low pass filter 720 is an RC network low pass filter, the echo residue detector 722 dynamically adjusts the gate voltage Vd to change the RC value of the RC network low pass filter 720 according to the detected echo residue. Thus, the echo cancellation device of the present invention obtains optimal performance by dynamically adjusting the low pass filter 720 according to the different characteristics of circuit components and the network environment. The function and implementation means of the pull-up current source Ia in FIG. 8 is substantially the same as the pull-up current source Ia in FIG. 4, therefore, further details are omitted here for brevity.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An echo cancellation device in a full duplex communication system, the full duplex communication system comprising a transmitter section for transmitting a transmit signal and a receiver section for receiving a receive signal, the echo cancellation device comprising:
    a filter for generating a filtering signal according to the transmit signal;
    an echo canceller coupled to the filter for generating an echo cancellation signal according to the filtering signal; and
    at least one resistor coupled to the transmitter section, the receiver section, and the echo canceller;
    wherein the echo canceller further comprises a pull-up current source for increasing a DC level of the echo canceller.

2. The echo cancellation device of claim 1, wherein the echo cancellation signal corresponds to the transmit signal.

3. The echo cancellation device of claim 1, wherein the echo canceller is a digital-to-analog converter (DAC).

4. The echo cancellation device of claim 1, wherein the filter is a digital filter.

5. The echo cancellation device of claim 1, wherein the filter is a low pass filter.

6. The echo cancellation device of claim 1, wherein the filter is an RC network filter.

7. The echo cancellation device of claim 6, wherein the RC network filter comprises a resistor.

8. The echo cancellation device of claim 7, wherein the RC network filter further includes a MOS transistor to be electrically equivalent to the resistor, wherein the control signal is employed to control the equivalent resistance of the MOS transistor through controlling the gate voltage of the MOS transistor.

9. The echo cancellation device of claim 6, wherein the RC network filter comprises a capacitor and the equivalent capacitance of the capacitor is controlled by the control signal.

10. The echo cancellation device of claim 9, wherein the capacitor is a parasitic capacitor.

11. The echo cancellation device of claim 9, wherein the RC network filter further includes a MOS transistor to be electrically equivalent to the capacitor of the RC network filter.

12. The echo cancellation device of claim 9, wherein the capacitor is a metal stacked-layer capacitor.

13. The echo cancellation device of claim 1, wherein the echo cancellation device further comprises an echo residue detector for outputting a control signal to control the filter according to the echo residue at the receiver section.

14. An echo cancellation device in a full duplex communication system, the full duplex communication system comprising a transmitter section for transmitting a transmit signal and a receiver section for receiving a receive signal, the echo cancellation device comprising:
    a filter for generating a filtering signal according to the transmit signal;
    an echo canceller coupled to the filter for generating an echo cancellation signal according to the filtering signal;
    at least one resistor coupled to the transmitter section, the receiver section, and the echo canceller; and
    an echo residue detector for outputting a control signal to control the filter according to the echo residue at the receiver section;
    wherein the echo canceller further comprises a pull-up current source for increasing a DC level of the echo canceller.

15. The echo cancellation device of claim 14, wherein the echo cancellation signal corresponds to the transmit signal.

16. The echo cancellation device of claim 14, wherein the echo canceller is a digital-to-analog converter (DAC).

17. The echo cancellation device of claim 14, wherein the filter is a digital filter.

18. The echo cancellation device of claim 17, wherein the digital low pass filter is a finite impulse response (FIR) filter and the FIR filter is adjusted through adjusting at least a coefficient of the FIR filter.

19. The echo cancellation device of claim 17, wherein the digital low pass filter is a infinite impulse response (IIR) filter and the IIR filter is adjusted through adjusting at least a coefficient of the IIR filter.

20. An transceiver in a full duplex communication system, the transceiver comprising:
    a receiver section for receiving a receive signal; and
    a transmitter section coupled to the receiver section for transmitting a transmit signal, the transmitter section comprising:
    generating an echo canceller for generating an echo cancellation signal according to the transmit signal; and
    at least one resistor coupled to the transmitter section, the receiver section, and the echo canceller;
    wherein the echo canceller further comprises a pull-up current source for increasing a DC level of the echo canceller.

21. The transceiver of claim 20, wherein the pull-up current source is an adjustable current source.

22. The transceiver of claim 20, wherein the pull-up current source is an AC signal.

* * * * *